(12) United States Patent
Masoud

(10) Patent No.: US 10,414,936 B2
(45) Date of Patent: Sep. 17, 2019

(54) ELECTROSTATIC INK COMPOSITION

(71) Applicant: HP Indigo B.V., Amstelveen (NL)

(72) Inventor: Emad Masoud, Nes Ziona (IL)

(73) Assignee: HP Indigo B.V., Amstelveen (NL)

(*) Notice: Subject to any disclaimer, the term of this patent is extended or adjusted under 35 U.S.C. 154(b) by 0 days.

(21) Appl. No.: 15/748,973

(22) PCT Filed: Oct. 16, 2015

(86) PCT No.: PCT/EP2015/074057
§ 371 (c)(1),
(2) Date: Jan. 30, 2018

(87) PCT Pub. No.: WO2017/063719
PCT Pub. Date: Apr. 20, 2017

(65) Prior Publication Data
US 2019/0002721 A1    Jan. 3, 2019

(51) Int. Cl.
| C09D 11/52 | (2014.01) |
| C09D 11/03 | (2014.01) |
| C09D 11/037 | (2014.01) |
| G03G 9/12 | (2006.01) |
| G03G 9/135 | (2006.01) |
| C09C 1/36 | (2006.01) |

(52) U.S. Cl.
CPC ............ *C09D 11/52* (2013.01); *C09C 1/3661* (2013.01); *C09C 1/3669* (2013.01); *C09C 1/3684* (2013.01); *C09D 11/03* (2013.01); *C09D 11/037* (2013.01); *G03G 9/122* (2013.01); *G03G 9/135* (2013.01); *G03G 9/1355* (2013.01)

(58) Field of Classification Search
CPC .................................. G03G 9/12; G03G 9/122
See application file for complete search history.

(56) References Cited

U.S. PATENT DOCUMENTS

| 5,840,453 | A | 11/1998 | Swidler |
| 6,255,363 | B1 | 7/2001 | Baker et al. |
| 6,633,735 | B2 | 10/2003 | Kellie et al. |
| 7,189,484 | B2 | 3/2007 | Kellie et al. |

(Continued)

FOREIGN PATENT DOCUMENTS

| EP | 1518908 | 3/2005 |
| JP | 10083100 | 3/1998 |

(Continued)

OTHER PUBLICATIONS

"DuPontTM Ti-Pure® titanium dioxide", DuPont Datasheet, 2007, 5 pages.

(Continued)

*Primary Examiner* — Peter L Vajda
(74) *Attorney, Agent, or Firm* — HP Inc. Patent Department

(57) ABSTRACT

There is provided an electrostatic ink composition comprising chargeable particles comprising white pigment particles having a basic species on their surface; and a charge director; wherein the white pigment particles are present in an amount of at least 75 wt % based on the total weight of the non-volatile solids in the electrostatic ink composition. A method of manufacturing an electrostatic ink composition and a printed medium are also described.

15 Claims, 4 Drawing Sheets

(56) References Cited

U.S. PATENT DOCUMENTS

| | | | |
|---|---|---|---|
| 7,824,830 B2 | 11/2010 | Kondo et al. | |
| 9,714,352 B2 * | 7/2017 | Chun | C09D 11/10 |
| 2003/0052952 A1 * | 3/2003 | Tanabe | C09C 1/3661 |
| | | | 347/100 |
| 2009/0305160 A1 | 12/2009 | Gal et al. | |
| 2015/0360497 A1 * | 12/2015 | Ishida | B41M 5/395 |
| | | | 428/32.69 |
| 2017/0192372 A1 * | 7/2017 | Mann | C09B 67/0013 |

FOREIGN PATENT DOCUMENTS

| | | |
|---|---|---|
| JP | 2009529706 | 8/2009 |
| WO | WO-2006/045086 | 4/2006 |
| WO | WO-2009/067414 | 5/2009 |
| WO | WO-2014/079482 | 5/2014 |
| WO | WO-2015/065469 | 5/2015 |
| WO | WO-2015/110174 | 7/2015 |

OTHER PUBLICATIONS

"DuPontTM Ti-Pure® R-104 Titanium Dioxide", DuPont Datasheet, 9 pages.
"Sachtleben Rutile Series", Huntsman Material Safety Data Sheet, 2015, 3 pgs http://www.sfm.state.or.us/CR2K_SubDB/MSDS/SACHTLEBEN_RODI.pdf.
International Search Report and Written Opinion for International Application No. PCT/EP2015/074057 dated Jun. 30, 2016, 11 pages.
"Sachtleben RFK 3" & "Sachtleben R 405", Sachtleben Chemie GmbH data sheets, 3 pages https://www.chemours.com/Titaniam_Technologies/en_US/products/104/R104_Intro_Brochure.pdf.

* cited by examiner

FIG. 2
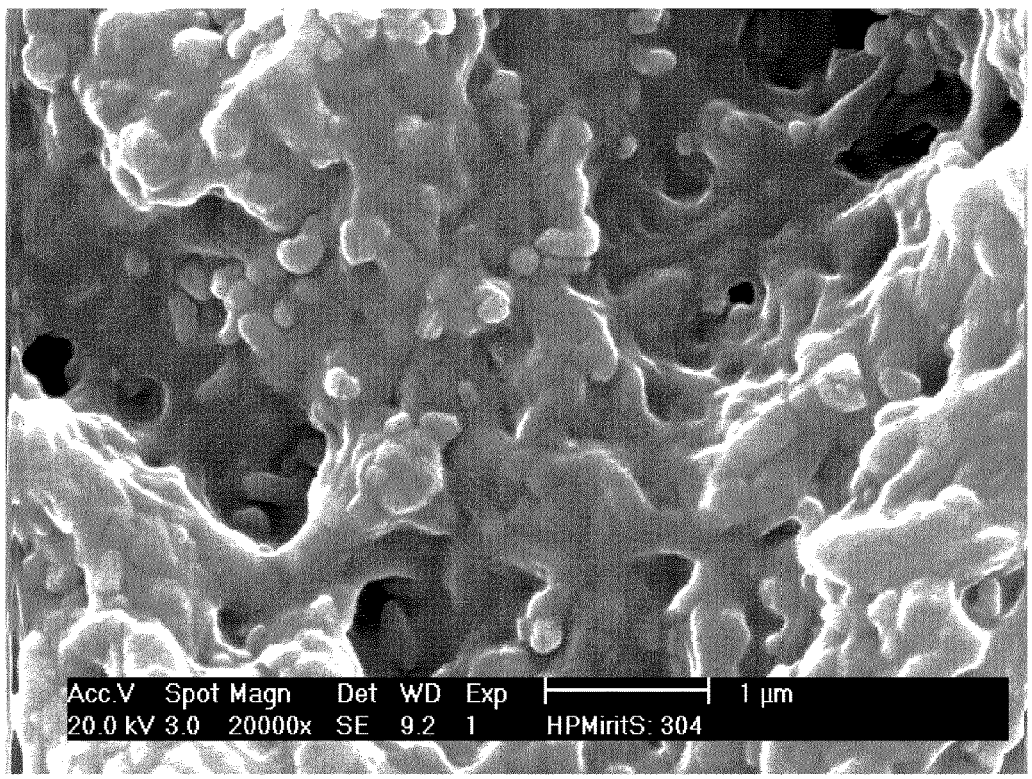
FIG. 3/6
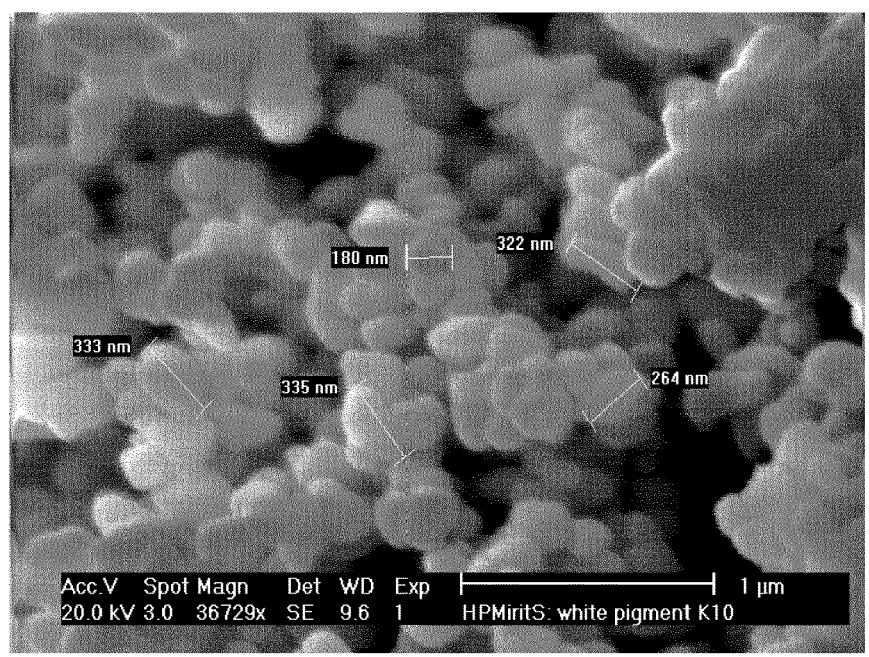

FIG. 4
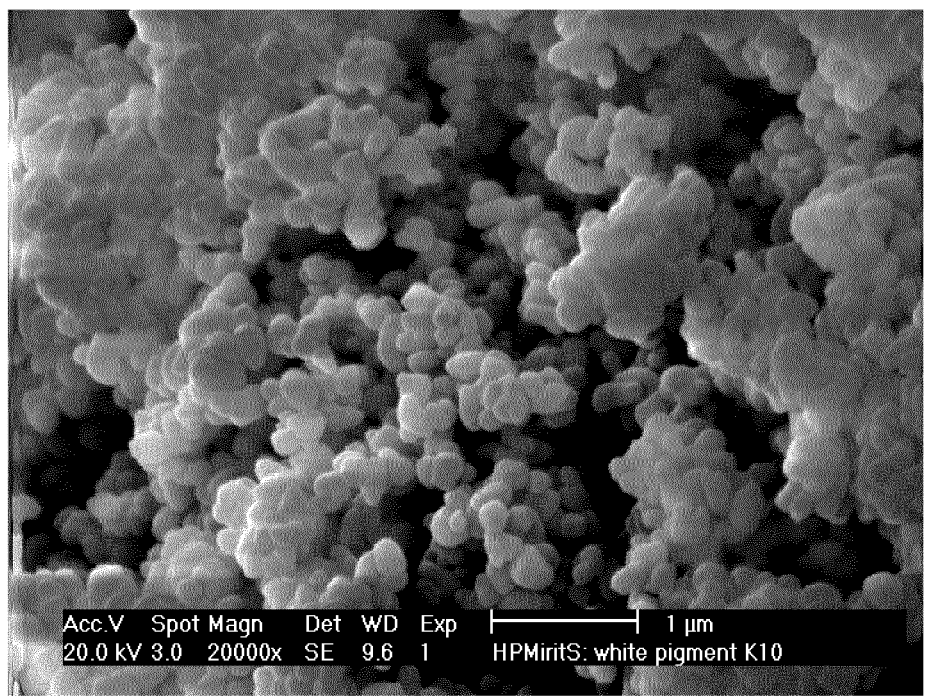
FIG. 5/6
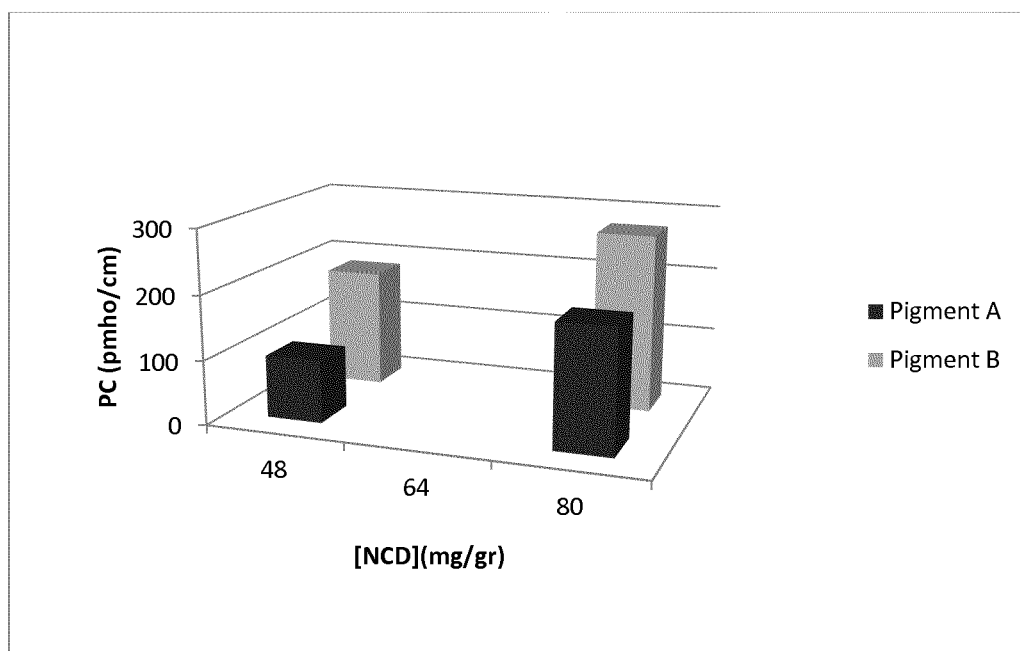

ELECTROSTATIC INK COMPOSITION

BACKGROUND

Electrostatic printing processes may involve creating an image on a photoconductive surface, applying an ink having charged particles to the photoconductive surface, such that they selectively bind to the image, and then transferring the charged particles in the form of the image to a print substrate.

The photoconductive surface may be on a cylinder and is otherwise termed a photo imaging plate (PIP). The photoconductive surface is selectively charged with a latent electrostatic image having image and background areas with different potentials. For example, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or by being first transferred to an intermediate transfer member, which can be a soft swelling blanket, and then to the print substrate.

BRIEF DESCRIPTION OF THE FIGURES

FIG. 2 shows an electron micrograph of an example of a reference electrostatic ink composition using a particular pigment (PIGMENT C) and having a 50% pigment loading. Further details are given in the Examples below.

FIGS. 3 and 4 show scanning electron micrographs of a pigment (denoted PIGMENT C in the Examples below) as received from the supplier.

FIG. 5 shows the particle charge (PC) of examples of electrostatic ink compositions as described herein having different pigments (denoted Pigments A and B). Further details are given in the Examples below. The particle charge for ink compositions containing Pigments A and B is plotted against the concentration of Charge Director (NCD) (given in mg of charge director per g of solids).

DETAILED DESCRIPTION

Figure 1:
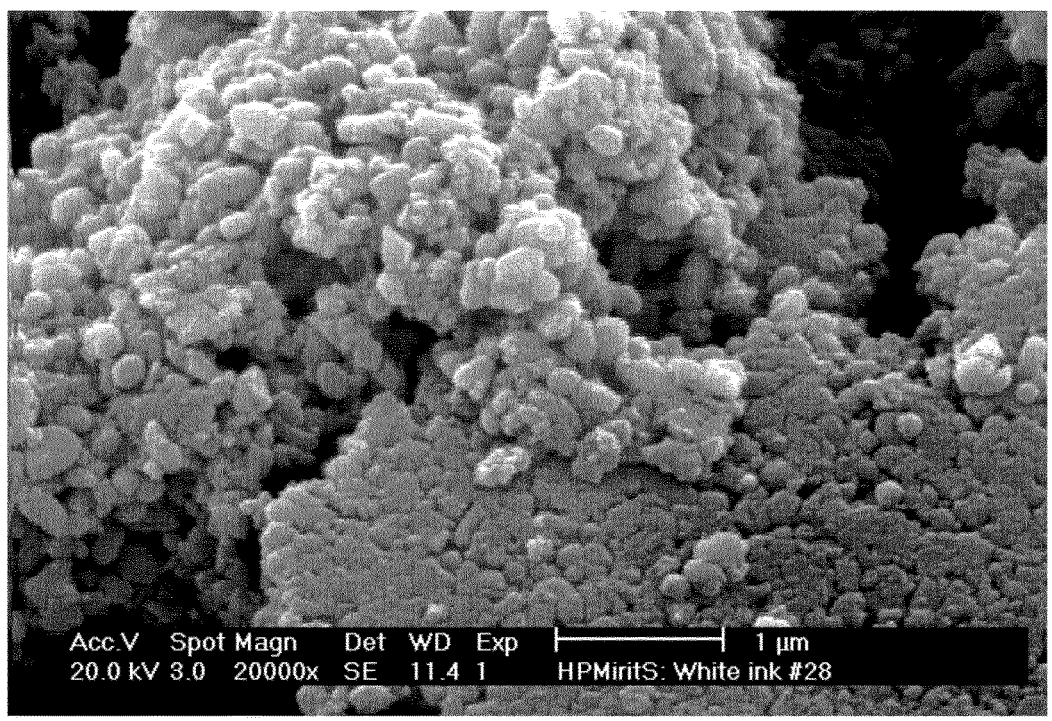
FIG. 1 shows an electron micrograph of an example of an electrostatic ink composition as described herein using a particular pigment (Pigment B) having a 95 wt % pigment loading, Further details are given in the Examples below.

Before the electrostatic ink composition and related aspects are disclosed and described, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid," "carrier," or "carrier vehicle" refers to the fluid in which the polymers, particles, colorant, charge directors and other additives can be dispersed to form a liquid electrostatic ink or electrophotographic ink. Such carrier liquids and vehicle components are known in the art. Typical carrier liquids can include a mixture of a variety of different agents, such as surfactants, co-solvents, viscosity modifiers, and/or other possible ingredients.

As used herein, "electrostatic ink composition" generally refers to an ink composition that is typically suitable for use in an electrostatic printing process, sometimes termed an electrophotographic printing process. The electrostatic ink composition may include chargeable particles of the resin and the pigment dispersed in a liquid carrier, which may be as described herein.

As used herein, "copolymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly, or indirectly via an intermediate transfer member, to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g. an electric field having a field gradient of 1000 V/cm or more, or in some examples 1500 V/cm or more.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, any feature described herein can be combined with any aspect or any other feature described herein.

In some examples, there is provided an electrostatic ink composition. The electrostatic ink composition may comprise:
a) chargeable particles comprising white pigment particles having a basic species on their surface; and
b) a charge director;
wherein the white pigment particles are present in an amount of at least 75 wt % based on the total weight of the non-volatile solids in the electrostatic ink composition.

In some examples, there is provided a method of manufacturing an electrostatic ink composition. The method may comprise combining:
a) chargeable particles comprising white pigment particles having a basic species on their surface; and
b) a charge director;
wherein the white pigment particles are present in an amount of at least 75 wt % based on the total weight of the non-volatile solids in the electrostatic ink composition.

In some examples, there is provided a printed medium having printed thereon an electrostatic ink composition. The electrostatic ink composition may comprise:
a) chargeable particles comprising white pigment particles having a basic species on their surface; and
b) a charge director;
wherein the white pigment particles are present in an amount of at least 75 wt % based on the total weight of the non-volatile solids in the electrostatic ink composition.

When printing white (opaque) electroinks it is useful to print as thin a layer as possible while maximising the opacity of the ink on the print medium. It has been found that, by using pigment particles whose surface has been treated to make it more basic, no (or very little) resin or charge adjuvant is necessary to produce a functioning electrostatic ink. In some examples, this can produce a electrostatic ink composition, which, when printed in a very thin layer (e.g. around 1 μm) has a high opacity.

This electrostatic ink composition described herein may be printed in a relatively thin layer, with well-dispersed, separated $TiO_2$ pigment particles, which show high light scattering efficiency, providing sufficient opacity in a printed layer.

It has been found that printing examples of the electrostatic ink described herein, where the pigment particles are not encapsulated in resin, enhances the scattering efficiency of the pigment by decreasing the average refractive index of the film matrix. The decrease in average index results in a larger difference in refractive index between the white pigment particles, e.g. $TiO_2$, and the film environment (which may, be in the case of examples of the inks disclosed here, be air; rather than a resin that encapsulates the particlesin), which in turn increases the scattering intensity of light as it enters and exits the $TiO_2$ particles. Air has a refractive index of 1.0, so incorporating air into a coating film has a significant impact on coating light scattering and hiding power.

Electrostatic Ink Composition

The electrostatic ink composition comprises chargeable particles comprising white pigment particles having a basic species on their surface; and a charge director; wherein the white pigment particles are present in an amount of at least 75 wt % based on the total weight of the non-volatile solids in the electrostatic ink composition.

In some examples, the white pigment particles, including any basic species on their surface, are present in an amount of at least 80 wt % based on the total weight of the non-volatile solids in the electrostatic ink composition, for example present in an amount of at least 85 wt %, for example present in an amount of at least 90 wt %, for example present in an amount of at least 95 wt % based on the total weight of the non-volatile solids in the electrostatic ink composition.

Resin

The electrostatic ink composition in some examples includes a resin, which may be a thermoplastic resin. A thermoplastic polymer is sometimes referred to as a thermoplastic resin. The resin may be present in the electrostatic ink composition in an amount of 25 wt % or less based on the total weight of the non-volatile solids in the electrostatic ink composition, in some examples 20 wt % or less based on the total weight of the non-volatile solids in the electrostatic ink composition, in some examples 15 wt % or less based on the total weight of the non-volatile solids in the electrostatic ink composition, in some examples 10 wt % or less based on the total weight of the non-volatile solids in the electrostatic ink composition, in some examples 8 wt % or less based on the total weight of the non-volatile solids in the electrostatic ink composition.

The resin may includes a polymer. The resin can include, but is not limited to, a thermoplastic polymer. In some examples, the polymer of the resin may be selected from ethylene acrylic acid copolymers; ethylene methacrylic acid copolymers; ethylene vinyl acetate copolymers; copolymers of ethylene (e.g. 80 wt % to 99.9 wt %), and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is, in some examples, from 1 to about 20 carbon atoms, such as methyl methacrylate (e.g. 50 wt % to 90 wt %))/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may comprise a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures in the art, for example using the procedure described in ASTM D1386.

The resin may comprise a polymer, in some examples a polymer having acidic side groups, that has a melt flow rate of less than about 60 g/10 minutes, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of in some examples about 50 g/10 minutes to about 120 g/10 minutes, in some examples 60 g/10 minutes to about 100 g/10 minutes. The melt flow rate can be measured using standard procedures in the art, for example as described in ASTM D1238.

The acidic side groups may be in free acid form or may be in the form of an anion and associated with multiple counterions, which may be metal counterions, e.g. a metal selected from the alkali metals, such as lithium, sodium and potassium, alkali earth metals, such as magnesium or calcium, and transition metals, such as zinc. The polymer having acidic sides groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt % to about 25 wt % of the copolymer, in some examples from 10 wt % to about 20 wt % of the copolymer.

The resin may comprise two different polymers having acidic side groups. The two polymers having acidic side groups may have different acidities, which may fall within the ranges mentioned above. The resin may comprise a first polymer having acidic side groups that has an acidity of from 50 mg KOH/g to 110 mg KOH/g and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The resin may comprise two different polymers having acidic side groups: a first polymer that is a copolymer of ethylene (e.g. 92 to 85 wt %, in some examples about 89 wt %) and acrylic or methacrylic acid (e.g. 8 to 15 wt %, in some examples about 11 wt %) having a melt flow rate of 80 to 110 g/10 minutes and a second polymer that is a copolymer of ethylene (e.g. about 80 to 92 wt %, in some examples about 85 wt %) and acrylic acid (e.g. about 18 to 12 wt %, in some examples about 15 wt %), having a melt viscosity lower than that of the first polymer, the second polymer for example having a melt viscosity of 15000 poise or less, in some examples a melt viscosity of 10000 poise or less, in some examples 1000 poise or less, in some examples 100 poise or less, in some examples 50 poise or less, in some examples 10 poise or less. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

In any of the resins mentioned above, the ratio of the first polymer having acidic side groups to the second polymer having acidic side groups can be from about 10:1 to about 2:1. In another example, the ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If resin comprises a single type of resin polymer, the resin polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may comprise two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The resin may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt % to about 16 wt % of the copolymer, in some examples 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples from 14 wt % to about 20 wt % of the copolymer, in some examples from 16 wt % to about 20 wt % of the copolymer in some examples from 17 wt % to 19 wt % of the copolymer.

In an example, the resin constitutes about 0 to 25 wt %, in some examples about 5 to 80%, by weight of the solids of the electrostatic ink composition. In another example, the resin constitutes about 0 to 20% by weight of the solids of the electrostatic ink composition. In another example, the resin constitutes about 0 to 15% by weight of the solids of the electrostatic ink composition. In another example, the resin constitutes about 0 to 10% by weight, in some examples from 0 to 5% by weight, of the solids of the electrostatic ink composition. In another example, the resin constitutes about 1 to 10% by weight, in some examples from 2 to 8% by weight, in some examples 3 to 7% by weight, of the solids of the electrostatic ink composition.

The resin may comprise a polymer having acidic side groups, as described above (which may be free of ester side groups), and a polymer having ester side groups. The polymer having ester side groups is, in some examples, a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, in some examples 5 to 40% by weight, in some examples 5 to 20% by weight of the copolymer, in some examples 5 to 15% by weight of the copolymer. The second monomer may constitute 1 to 50% by weight of the co-polymer, in some examples 5 to 40% by weight of the co-polymer, in some examples 5 to 20% by weight of the co-polymer, in some examples 5 to 15% by weight of the copolymer. In an example, the first monomer constitutes 5 to 40% by weight of the co-polymer, the second monomer constitutes 5 to 40% by weight of the co-polymer, and with the third monomer constituting the remaining weight of the copolymer. In an example, the first monomer constitutes 5 to 15% by weight of the co-polymer, the second monomer constitutes 5 to 15% by weight of the co-polymer, with the third monomer constituting the remaining weight of the copolymer. In an example, the first monomer constitutes 8 to 12% by weight of the co-polymer, the second monomer constitutes 8 to 12% by weight of the co-polymer, with the third monomer constituting the remaining weight of the copolymer. In an example, the first monomer constitutes about 10% by weight of the co-polymer, the second monomer constitutes about 10% by weight of the co-polymer, and with the third monomer constituting the remaining weight of the copolymer. The polymer having ester side groups may be selected from the Bynel® class of monomer, including Bynel 2022 and Bynel 2002, which are available from DuPont®.

The polymer having ester side groups may constitute 1% or more by weight of the total amount of the resin polymers in the resin, e.g. the total amount of the polymer or polymers having acidic side groups and polymer having ester side groups. The polymer having ester side groups may constitute 5% or more by weight of the total amount of the resin polymers in the resin, in some examples 8% or more by weight of the total amount of the resin polymers in the resin, in some examples 10% or more by weight of the total amount of the resin polymers in the resin, in some examples 15% or more by weight of the total amount of the resin polymers in the resin, in some examples 20% or more by weight of the total amount of the resin polymers in the resin, in some examples 25% or more by weight of the total amount of the resin polymers in the resin, in some examples 30% or more by weight of the total amount of the resin polymers in the resin, in some examples 35% or more by weight of the total amount of the resin polymers in the resin. The polymer having ester side groups may constitute from 5% to 50% by weight of the total amount of the resin polymers in the resin, in some examples 10% to 40% by weight of the total amount of the resin polymers in the resin, in some examples 15% to 30% by weight of the total amount of the polymers in the resin.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

In an example, the polymer or polymers of the resin can be selected from the Nucrel family of toners (e.g. Nucrel 403™, Nucrel 407™, Nucrel 609HS™, Nucrel 908HS™, Nucrel 1202HC™, Nucrel 30707™ Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aaclyn 201, Aclyn 246, Aclyn 285, and Aclyn 295), and the Lotader family of toners (e.g. Lotader 2210, Lotader, 3430, and Lotader 8200 (sold by Arkema)).

Pigment

The electrostatic ink composition comprises chargeable particles comprising white pigment particles having a basic species on their surface. In some examples, the basic species on the surface of the white pigment particles has a pH of greater than 7.5 at 15° C. and in standard aqueous conditions, for example a pH of greater than 7.7, for example a pH of greater than 7.9, for example a pH of greater than 8.1, for example a pH of greater than 8.3, for example a pH of greater than 8.5, for example a pH greater than 8.7, for example a pH greater than 8.9 at 15° C. and in standard aqueous conditions. The basic species may constitute from 0.5 wt % to 10 wt % of the white pigment particles, in some examples from 1 wt % to 5 wt %, in some examples from 1.5 wt % to 4 wt %, in some examples from 1.5 wt % to 3 wt %, in some examples from 1.6 wt % to 2.5 wt % of the white pigment particles.

In some examples, the white pigment particles have been surface-treated using an organic species. The organic treatment may increase compatibility with the resin and to improve dispersion and reduce agglomeration during storage. Silicones and siloxanes such as polydimethylsiloxane are commonly used to produce hydrophobic pigments. The hydrophobic (apolar) surface treatment makes the $TiO_2$ more compatible with apolar environments (such as polyethylene resin and Isopar-L). The organic species may constitute of from 0.1 wt % to 5 wt % of the white pigment particles, in some examples from 0.1 wt % to 3 wt % of the pigment particles, in some examples from 0.5 wt % to 2 wt % of the pigment particles.

In some examples, the white pigment particles have been surface-treated using an organosilicon reagent, for example an organosilicon reagent having the general formula

$$R_xSi(R')_{4-x}$$

wherein R is non-hydrolyzable aliphatic, cycloaliphatic or aromatic group having at least 1 to about 50 carbon atoms; R' is a hydrolyzable group such as an alkoxy, halogen, acetoxy, hydroxy or mixtures thereof; and x=1 to 3.

In some examples, the organic species is selected from silicones and siloxanes.

In some examples, the white pigment particles have been surface-treated using a silane reagent, for example vinyltriethoxy silane, butyltrimethoxysilane, hexyltrimethoxysilane, octyltriethoxysilane, nonyltriethoxysilane, etc. Additional examples of silanes, using the above formula, include where R'=8-18 carbon atoms; R'=chloro, methoxy, hydroxy or mixtures thereof; and x=1 to 3.

In some examples, the white pigment particles have been surface-treated using a fluoroorganosilicon reagent, i.e., wherein R is fluorine-substituted, such as $C_nF_{2n+1}$ wherein n=8, 10, 12 or mixtures thereof; R' is a hydrolyzable group such as an alkoxy, halogen, acetoxy, hydroxy or mixtures thereof; and x=1 to 3. In some examples, the white pigment particles have been surface-treated using an organic reagent selected from trichloroperfluoroethylsilane, trichloroperfluorodecylsilane, and trichloroperfluorododecylsilane.

In some examples, the white pigment particles have been surface-treated using at least one polysiloxane having the formula:

$$(R_nSiO_{\frac{4-n}{2}})_m$$

wherein R is organic or inorganic groups; n=0-3; and m≥2.

In some examples, the white pigment particles have been surface-treated using an organic reagent selected from polydimethylsiloxane (PDMS), vinylphenylmethyl-terminated dimethylsiloxanes and divinylmethyl terminated polydimethylsiloxane, or a mixture thereof. In some examples, the white pigment particles have been surface-treated using polydimethylsiloxane.

In some examples, the basic species on the surface of the white pigment particles is an inorganic species. In some examples, the white pigment particles have been surface-treated using an inorganic species to form white pigment particles having a basic species on their surface. In some examples, the inorganic species is a metal oxide. In some examples, the inorganic species is selected from oxides of aluminum and oxides of zirconium. The process used to prepare the pigment may be a "wet process", where, for example, a dense silica is precipitated as an adherent coating on titanium dioxide and thereafter a percentage of alumina is precipitated in an agues slurry of the silica coated pigment.

In some examples, the white pigment particles have been surface-treated with both an inorganic species and an organic species as described above.

In some examples, the white pigment particles comprise a first metal oxide and the species on the surface comprises a second metal oxide.

In some examples, the white pigment particles comprise a material are selected from $TiO_2$, calcium carbonate, zinc oxide, and mixtures thereof, and in some examples this material constitutes at least 85 wt %, in some examples at least 90 wt %, of the white pigment particles, the remaining wt % being the surface treatment, if present, as described herein. In some examples, the white pigment particles comprise a material selected from rutile, anatase, and brookite, and mixtures thereof. In some examples, the white pigment particles are in the form of rutile. The rutile form of $TiO_2$ exhibits the highest refractive index among the other forms of $TiO_2$ and the other listed pigments. All other parameters of inks being the same, the highest refractive index yields the highest opacity.

In some examples, the white pigment particles comprise $TiO_2$ particles and the species on the surface comprises alumina or zirconia, for example the species on the surface comprises alumina, for example the species on the surface comprises zirconia.

In some examples, the white pigment particles comprise rutile particles and the species on the surface comprises alumina or zirconia, for example the species on the surface comprises alumina, for example the species on the surface comprises zirconia.

In some examples, the electrostatic ink composition includes $TiO_2$, calcium carbonate, zinc oxide, and mixtures thereof, where the surface of the pigment particles has been modified. The surface modification can be with either an inorganic or an organic surface-modifying agent or with both.

Charge Director and Charge Adjuvants

The electrostatic ink composition comprises a charge director. A charge director can be added to an electrostatic ink composition to impart a charge of a desired polarity and/or maintain sufficient electrostatic charge on the resin particles of an electrostatic ink composition. The charge director may comprise ionic compounds, particularly metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from, but is not limited to, oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates. The charge director can impart a negative charge or a positive charge on the resin-containing particles of an electrostatic ink composition.

In some examples, the charge director comprises a sulfosuccinate salt of the general formula MAn, wherein M is a metal, n is the valence of M, and A is an ion of the general formula (I):

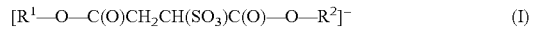

$$[R^1\!-\!O\!-\!C(O)CH_2CH(SO_3)C(O)\!-\!O\!-\!R^2]^- \quad (I)$$

wherein each of $R^1$ and $R^2$ is an alkyl group.

The sulfosuccinate salt of the general formula MAn is an example of a micelle forming salt. The charge director may be substantially free or free of an acid of the general formula HA, where A is as described above. The charge director may include micelles of said sulfosuccinate salt enclosing at least some of the nanoparticles. The charge director may include at least some nanoparticles having a size of 200 nm or less, and/or in some examples 2 nm or more.

In some examples, the charge director may comprise a simple salt. The simple salts are salts that do not form micelles by themselves, although they may form a core for micelles with a micelle forming salt. The ions constructing the simple salts are all hydrophilic. The simple salt may include a cation selected from the group consisting of Mg, Ca, Ba, NH4, tert-butyl ammonium, Li+, and Al+3, or from any sub-group thereof. The simple salt may include an anion selected from the group consisting of $SO_4^{2-}$, $PO^{3-}$, $NO^{3-}$, $HPO_4^{2-}$, $CO_3^{2-}$, acetate, trifluoroacetate (TFA), Cl⁻, $BF_4^-$, F—, $ClO_4$—, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)3$, $LiClO_4$ and $LiBF_4$, or any sub-group thereof. The charge director may further include basic barium petronate (BBP).

In the formula $[R_1\!-\!O\!-\!C(O)CH_2CH(SO_3^-)C(O)\!-\!O\!-\!R_2]$, in some examples each of $R_1$ and $R_2$ is an aliphatic alkyl group. In some examples, each of $R_1$ and $R_2$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R_1$ and $R_2$ are the same. In some examples, at least one of $R_1$ and $R_2$ is $C_{13}H_{27}$. In some examples, M is Na, K, Cs, Ca, or Ba.

In some examples, the charge director may comprise one of, some of, or all of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to 20%, in some examples 0.01% to 20% by weight, in some examples 0.01 to 10% by weight, in some examples 0.01% to 1% by weight of the solids of an electrostatic ink composition. In some examples, the charge director constitutes about 0.001% to 0.15% by weight of the solids of the electrostatic ink composition, in some examples 0.001% to 0.15%, in some examples 0.001% to 0.02% by weight of the solids of an electrostatic ink composition, in some examples 0.1% to 2% by weight of the solids of the electrostatic ink composition, in some examples 0.2% to 1.5% by weight of the solids of the electrostatic ink composition in some examples 0.1% to 1% by weight of the solids of the electrostatic ink composition, in some examples 0.2% to 0.8% by weight of the solids of the electrostatic ink composition. In some examples, the charge director is present in an amount of at least 1 mg of charge director per gram of solids of the electrostatic ink composition (which will be abbreviated to mg/g herein), in some examples at least 2 mg/g, in some examples at least 3 mg/g, in some examples at least 4 mg/g, in some examples at least 5 mg/g, in some examples at least 20 mg/g, in some examples at least 40 mg/g, in some examples at least 50 mg/g, in some examples at least 60 mg/g. In some examples, the charge director is present in an amount of from 1 mg/g to 100 mg/g, in some examples from 20 mg/g to 100 mg/g, in some examples from 40 mg/g to 100 mg/g, in some examples from 60 mg/g to 100 mg/g, in some examples from 70 mg/g to 900 mg/g, in some examples about 80 mg/g. In some examples, the charge director is present in an amount of from 1 mg/g to 25 mg/g, in some examples from 1 mg/g to 20 mg/g, in some examples from 1 mg/g to 15 mg/g, in some examples from 1 mg/g to 10 mg/g, in some examples from 3 mg/g to 20 mg/g, in some examples from 3 mg/g to 15 mg/g, in some examples from 5 mg/g to 10 mg/g.

The electrostatic ink composition may further include a charge adjuvant. A charge adjuvant may promote charging of the particles when a charge director is present. The method as described here may involve adding a charge adjuvant at any stage. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate. The charge adjuvant may be present in an amount of about 0.1 to 5% by weight, in some examples about 0.1 to 1% by weight, in some examples about 0.3 to 0.8% by weight of the solids of the electrostatic ink composition, in some examples about 1 wt % to 3 wt % of the solids of the electrostatic ink composition, in some examples about 1.5 wt % to 2.5 wt % of the solids of the electrostatic ink composition.

In some examples, the electrostatic ink composition further includes, e.g. as a charge adjuvant, a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is Al3+. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of multivalent cation and a fatty acid anion, may be present in an amount of 0.1 wt % to 5 wt % of the solids of the electrostatic ink composition, in some examples in an amount of 0.1 wt % to 2 wt % of the solids of the electrostatic ink composition, in some examples in an amount of 0.1 wt % to 2 wt % of the solids of the electrostatic ink composition, in some examples in an amount of 0.3 wt % to 1.5 wt % of the solids of the electrostatic ink composition, in some examples about 0.5 wt % to 1.2 wt % of the solids of the electrostatic ink composition, in some examples about 0.8 wt % to 1 wt % of the solids of the electrostatic ink composition, in some examples about 1 wt % to 3 wt % of the solids of the electrostatic ink composition, in some examples about 1.5 wt % to 2.5 wt % of the solids of the electrostatic ink composition. In some examples, the electrostatic ink composition may lack or substantially lack a salt of multivalent cation and a fatty acid anion, e.g. 1 wt % or less of the solids of the electrostatic ink composition may be a salt of multivalent cation and a fatty acid anion, in some examples 0.5 wt % or less, in some examples 0.1 wt % or less, in some examples 0.05 wt % or less.

Liquid Carrier

In some examples, the electrostatic ink composition comprises a liquid carrier. Generally, the liquid carrier can act as a dispersing medium for the other components in the electrostatic ink composition. For example, the liquid carrier can comprise or be a hydrocarbon, silicone oil, vegetable oil, etc. The liquid carrier can include, but is not limited to, an insulating, non-polar, non-aqueous liquid that can be used as a medium for toner particles. The liquid carrier can include compounds that have a resistivity in excess of about $10^9$ ohm-cm. The liquid carrier may have a dielectric constant below about 5, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™)

Before printing, the liquid carrier can constitute about 20% to 99.5% by weight of the electrostatic ink composition, in some examples 50% to 99.5% by weight of the electrostatic ink composition. Before printing, the liquid carrier may constitute about 40 to 90% by weight of the electrostatic ink composition. Before printing, the liquid carrier may constitute about 60% to 80% by weight of the electrostatic ink composition. Before printing, the liquid carrier may constitute about 90% to 99.5% by weight of the electrostatic ink composition, in some examples 95% to 99% by weight of the electrostatic ink composition.

The ink, when printed on the print substrate, may be substantially free from liquid carrier. In an electrostatic printing process and/or afterwards, the liquid carrier may be removed, e.g. by an electrophoresis processes during printing and/or evaporation, such that substantially just solids are transferred to the print substrate. Substantially free from liquid carrier may indicate that the ink printed on the print substrate contains less than 5 wt % liquid carrier, in some examples, less than 2 wt % liquid carrier, in some examples less than 1 wt % liquid carrier, in some examples less than 0.5 wt % liquid carrier. In some examples, the ink printed on the print substrate is free from liquid carrier.

Dispersant

The electrostatic ink composition in some examples further comprises a dispersant, which is either basic or acidic, and in some examples the dispersant is or comprises a polymeric dispersant or a surfactant. In some examples, the dispersant is or comprises an electrostatic dispersant or a steric dispersant, or both an electrostatic and a steric dispersant.

A polymeric dispersant is a polymeric material having an anchor group capable of being absorbed on to the surface of a particle in a colloidal system and polymeric chains giving steric stabilisation, so as to hold the particles apart.

Polymeric dispersants are two-component structures, comprising an anchor group (providing strong adsorption onto the pigment surface by single-point or multi-point anchoring) and one or more polymeric chain(s) (attached to the anchoring group to provide steric stabilization). In some examples, the dispersant may comprise a polymeric dispersant comprising:

1. a polymer chain with a terminal anchor group, or
2. a polymer chain with an anchor group at both ends, or
3. a BAB block co-polymer, or
4. an ABA block co-polymer, or
5. a random co-polymer, or
6. a comb co-polymer;

wherein the anchor group is a group which binds to or is absorbed by the pigment particle.

In some examples, on addition to the pigment before mixing, the polymeric dispersant is in suspension or dissolved in a solvent, in some examples the dispersant comprises greater than 50 wt % polymeric dispersant, in some examples the dispersant comprises greater than 60 wt % polymeric dispersant, in some examples the dispersant comprises greater than 70 wt % dispersant, in some examples the dispersant comprises greater than 80 wt % polymeric dispersant, in some examples the dispersant comprises greater than 90 wt % polymeric dispersant. The solvent may be an organic solvent, in some examples. a deeply hydrogenated solvent, in some examples a solvent which consists essentially of $C_9$-$C_{11}$ paraffins and naphthenes. The dispersant may consist of, or consist essentially of, polymeric dispersant.

In some examples, the polymeric dispersant is a basic polymeric dispersant. In some examples, the polymeric dispersant is a basic dispersant, and comprises a basic anchor group, e.g. an amine group. In some examples, each polymeric dispersant molecule comprises a multi amine anchor group or a single amine anchor group, in some examples each polymeric dispersant molecular comprises a multi amine anchor group. In some examples, the polymeric dispersant comprises polyolefin amide alkeneamine.

In some examples, the dispersant is an acidic dispersant and comprises an acidic anchor group, e.g. a carboxylic acid group. In some examples, the dispersant is a polyhydroxy stearic acid. A polyhydroxystearic acid is available as Solsperse 3000 or Solsperse 21000, from Lubrizol. In some examples, the dispersant comprises an alkoxylate chain and an acidic head group, an example of which is Solplus AX5, available from Lubrizol.

In some examples, each polymeric dispersant molecule comprises one polymer chain or a plurality of polymer chains. In some examples, each polymeric dispersant molecule comprises one polymer chain having a single anchor group, for example an amine group. In some examples, each polymeric dispersant molecule comprises one polymer chain having a plurality of anchor groups, for example a plurality of amine groups. In some examples, the polymer chain has acidic side groups.

In some examples, the polymeric dispersant comprises a co-polymer. In some examples, the polymeric dispersant comprises a block co-polymer having multiple anchor groups, for example an ABA block co-polymer or a BAB block co-polymer or a random copolymer. In some examples, the polymeric dispersant comprises a comb co-polymer.

Basic polymeric dispersants include SOLSPERSE® 11200, SOLSPERSE® 13300; the SOLPLUS® series, by the same manufacturer (e.g., SOLPLUS® K500). Other polymeric dispersants that can be used as or with the dispersants described herein include others in the SOLSPERSE® series manufactured by Lubrizol Corp., Wickliffe, OH (e.g., SOLSPERSE® 3000, SOLSPERSE® 8000, SOLSPERSE® 9000, SOLSPERSE® 13840, SOLSPERSE® 16000, SOLSPERSE® 17000, SOLSPERSE® 18000, SOLSPERSE® 19000, SOLSPERSE® 20000, SOLSPERSE® 21000, SOLSPERSE® 27000, or SOLSPERSE® 43000); various dispersants manufactured by BYKchemie, Gmbh, Germany, (e.g., DISPERBYK® 106, DISPERBYK® 110, DISPERBYK® 163, DISPERBYK® 170 or DISPERBYK® 180); various dispersants manufactured by Evonik Goldschmidt GMBH LLC, Germany, (e.g., TEGO® 630, TEGO® 650, TEGO® 651, TEGO® 655, TEGO® 685 or TEGO® 1000); various dispersants manufactured by Sigma-Aldrich, St. Louis, Mo., (e.g., SPAN® 20, SPAN® 60, SPAN® 80 or SPAN® 85); or various dispersants manufactured by Petrolite Corp., St. Louis, Mo. (e.g., Ceramar™ 1608 and Ceramar™ X-6146, etc.).

In some examples, the dispersant is or comprises a surfactant, in some examples the dispersant is or comprises a surfactant selected from fatty acid derivatives, sulphate esters, sulfonate esters, phosphate esters, carboxylates, sodium polyacrylates, polyacrylic acid, alkyl ethers, acetylene diols, and soya lecithin.

In some examples, the dispersant is or comprises a succinimide. The succinimide may be linked, e.g. via a hydrocarbon-containing linker group, to an amine group. In some examples, the dispersant comprises a polyisobutylene succinimide having a head group comprising an amine.

In some examples, the dispersant is of formula (I)

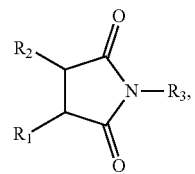

formula (I)

wherein $R_1$, $R_2$ and $R_3$ are selected from an amine-containing head group, a hydrocarbon tail group and hydrogen,
wherein at least one of $R_1$, $R_2$ and $R_3$ comprises a hydrocarbon tail group,
at least one of $R_1$, $R_2$ and $R_3$ comprises an amine-containing head group. In some examples, $R_1$ and $R_2$ are selected from a hydrocarbon tail group and hydrogen, with at least one of $R_1$ and $R_2$ comprising a hydrocarbon tail group, and $R_3$ comprises an amine-containing head group. The hydrocarbon tail group may comprise or be a hydrocarbon group, which may be branched or straight chain and may be unsubstituted. The hydrocarbon tail group may comprise or be a hydrocarbon group containing a polyalkylene, which may be selected from a polyethylene, polypropylene, polybutylene. In some examples, the hydrocarbon tail group may contain a polyisobutylene. The hydrocarbon tail group may contain from 10 to 100 carbons, in some examples from 10 to 50 carbons, in some examples from 10 to 30 carbons. The hydrocarbon tail group may be of the formula (II)

P-L- formula (II), wherein P is or comprises polyisobutylene and L is selected from a single bond, $(CH_2)_n$, wherein n is from 0 to 5, in some examples 1 to 5, —O— and —NH—. In some examples, the amine-containing head group comprises or is a hydrocarbon group having an amine group attached to one of the carbons of the hydrocarbon group. In some examples, the amine-containing head group is of the formula (III)

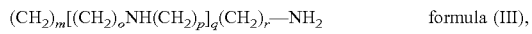
$(CH_2)_m[(CH_2)_oNH(CH_2)_p]_q(CH_2)_r$—$NH_2$ formula (III), wherein m is at least 1, in some examples 1 to 5, q is 0 to 10, o is 0, 1 or 2, p is 1 or 2, r is 0 to 10; in some examples, m is 1, o is 1, p is 1 and q is from 0 to 10, in some examples from 1 to 5, and in some examples r is 1 to 5; in some examples m is 1, q is 0 to 10, in some examples 1 to 10, in some examples 1 to 5, o is 1, p is 1, r is 1.

In some examples, the dispersant is of formula (I), wherein $R_1$ is of formula (II), $R_2$ is H and $R_3$ is of formula (III). In some examples, the dispersant is of formula (I), wherein $R_1$ is of formula (II), wherein L is —$CH_2$—, $R_2$ is H and $R_3$ is of formula (III), wherein m is 1, q is 0 to 10, in some examples 1 to 10, in some examples 1 to 5, o is 1, p is 1 and r is 1. In some examples, the dispersant is or comprises polyisobutylene succimide polyethylene amine non ionic dispersant. In some examples, the dispersant is or comprises Solperse® J560 and/or Lubrizol® 6406.

In some examples, the dispersant is or comprises an alkyl succimide amido salt, in some examples a polyisobutylene succimide amido salt, in some examples an alkyl succimide amido amino salt, in some examples polyisobutylene succimide amido ammonium salt, and in some examples the polyisobutylene succimide amido ammonium salt comprises a plurality of amido and/or ammonium groups, and in some examples the polyisobutylene succimide amido ammonium salt comprises at least one branched group, e.g. a branched alkyl group, and a plurality of amido and/or ammonium groups, which may be attached, directly or indirectly to the at least one branched group. In some examples, the dispersant is or comprises OS 13309, which is available from Lubrizol Corporation.

In some examples, the dispersant is a basic dispersant having a total base number (TBN) of at least 5 mgKOH/gr material, in some examples a TBN of at least 10 mgKOH/gr material, in some examples a TBN of at least 20 mgKOH/gr material, in some examples a TBN of at least 30 mgKOH/gr material, in some examples from 5 mgKOH/gr material to 150 mgKOH/gr material, in some examples from 5 mgKOH/gr material to 150 mgKOH/gr material, in some examples from 20 mgKOH/gr material to 140 mgKOH/gr material, in some examples from 5 mgKOH/gr material to 50 mgKOH/gr material, in some examples from 10 mgKOH/gr material to 30 mgKOH/gr material, in some examples from 15 mgKOH/gr material to 25 mgKOH/gr material, in some examples from 15 mgKOH/gr material to 20 mgKOH/gr material.

In some examples, the dispersant is a basic dispersant having a total base number (TBN) of from 30 mgKOH/gr material to 60 mgKOH/gr material, in some examples from 35 mgKOH/gr material to 55 mgKOH/gr material, in some examples about 45 mgKOH/gr material.

In some examples, the dispersant is a basic dispersant having a total base number (TBN) of at least 100 mgKOH/gr material, in some examples from 100 mgKOH/gr material to 140 mgKOH/gr material, in some examples from 100 mgKOH/gr material to 140 mgKOH/gr material, in some examples from 110 mgKOH/gr material to 130 mgKOH/gr material, in some examples from 115 mgKOH/gr material to 120 mgKOH/gr material.

Total base number (TBN), sometimes simply referred to as base number, may be determined using standard techniques, including, those laid out in ASTM Designation D4739-08, such as Test Method D2896, Test Method D4739, and ASTM Designation D974-08, with Test Method D2896 being used if any discrepancy is shown between test methods, and unless otherwise stated, the test method(s) will be the most recently published at the time of filing this patent application. "mgKOH/gr material" indicates "mgKOH per gram of dispersant". The measurement of TBN of the dispersant can either be on the pure dispersant, or a dispersant in a hydrocarbon liquid, such 60 wt % dispersant in white spirit, e.g. dearomatized white spirit, and then adjusted as if it had been measured on the pure dispersant.

In some examples, the dispersant comprises a succinimide, which may be as described above, and the succinimide has a molecular weight (MW) of from 500 Daltons to 10,000 Daltons, in some examples a MW of from 1000 to 6,000 Daltons, in some examples a MW of from 1000 to 6,000 Daltons, in some examples a MW of from 1000 to 5000 Daltons, in some examples a MW of from 2000 to 4000 Daltons, in some examples a MW of about 3000 Daltons, or in some examples a MW of from 500 to 3000 Daltons, in some examples a MW of from 1000 to 2000 Daltons, in some examples a MW of from 1200 to 1800 Daltons, in some examples a MW of from 1300 to 1500 Daltons, in some examples a MW of 1400 Daltons.

In some examples, the dispersant comprises an ester of an optionally substituted fatty acid, in some examples an ester of an optionally substituted hydroxy fatty acid. A fatty acid may be defined as a carboxyl group covalently bonded to a hydrocarbon chain (e.g. a C12 to C22 carbon chain), which may be saturated or unsaturated, and a hydroxy fatty acid is one in which at least one carbon of the hydrocarbon chain of the fatty acid is substituted with a hydroxyl group. In some examples, the dispersant comprises an ester of an hydroxy fatty acid (the carboxyl group being esterified) in which the hydroxyl group has a substituent thereon, and the substituent may be selected from an optionally substituted alkyl ester (e.g. C1 to C6, e.g. C2 to C4, e.g. C3) or an optionally substituted alkyl amide, wherein the substituent (if present) of the alkyl of the optionally substituted alkyl ester or optionally substituted alkyl amide is a salt, e.g. a trimethyl ammonium salt. In some examples, the dispersant, which may be an oligomeric dispersant, comprises a saturated or unsaturated ricinoleic acid ester capped with a propyl amide terminus connected to tri methyl ammonium salt. In some examples, the dispersant is or comprises Solplus® K500, available from Lubrizol.

The % AOWP (the percentage agent on the weight of pigment) is the number of grams of dispersant per 100 g of pigment. In some examples, the % AOWP of the dispersion is from 1% to 70%, in some examples from 1% to 60%, in some examples from 5% to 55%, in some examples from 10% to 50%, in some examples from 10% to 40%, in some examples from 10% to 30%, in some examples from 15% to 25%.

The dispersant may constitute from 0.1 wt % to 12 wt % of the electrostatic ink composition, in some examples 0.5 wt % to 6 wt % the electrostatic ink composition, in some examples 1 wt % to 6 wt % of the electrostatic ink composition, in some examples 2 wt % to 4 wt % of the electrostatic ink composition.

Other Additives

The electrostatic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

Method

Also provided is a method of manufacturing an electrostatic ink composition according to the first aspect, comprising combining
 a) chargeable particles comprising white pigment particles having a basic species on their surface; and
 b) a charge director;
  wherein the white pigment particles are present in an amount of at least 75 wt % based on the total weight of the non-volatile solids in the electrostatic ink composition.

In some examples, the above method comprises grinding the white pigment particles in a carrier liquid, and wherein a charge director is combined with the white pigment particles before, during or after the grinding to form the electrostatic ink composition.

In some examples, the above method comprises mixing, e.g. grinding, a resin and a carrier liquid to form a resin paste; and then grinding the resin paste with the white pigment particles, and wherein a charge director is combined with the pigment and resin paste before, during or after the grinding of the pigment paste with the pigment to form the electrostatic ink composition.

In some examples, the liquid carrier is present during the grinding of resin; and in some examples, the liquid carrier constitutes 10 to 99% by weight of the composition being ground in the mill, in some examples 30 to 99% by weight of the composition being ground in the mill, in some examples 50 to 95% by weight of the composition being ground in the mill, in some examples 70 to 90% by weight of the composition being ground in the mill. The grinding to form the resin paste and/or grinding of the resin paste with the white pigment particles, may be in a mill and may be carried out by rotating the mixture such that the RPM of the rotations is at least 100 RPM, in some examples at least 200 RPM, in some examples at least 250 RPM; and in some examples the grinding may be carried out for a period of at least 1 hour, in some examples 2 hours, in some examples 3 hours, in some examples 4 hours. The temperature during grinding may be at least 20° C., in some examples at least 25° C., in some examples at least 30° C., in some examples at least 40° C. A suitable grinding mill is a ball mill or attritor. A commercially available attritor is available from Union Process, such as a Union S1-attritor.

Printed Medium and Printing Process

Also provided is a printed medium having printed thereon an electrostatic ink composition comprising:
 a) chargeable particles comprising white pigment particles having a basic species on their surface; and
 b) a charge director;
wherein the white pigment particles are present in an amount of at least 75 wt % based on the total weight of the non-volatile solids in the electrostatic ink composition.

In some examples, the above printed medium comprises a transparent electrostatic ink composition comprising a thermoplastic resin and a charge director and/or charge adjuvant. In this context, "transparent" means having no or substantially no colorant or pigment. The transparent electrostatic ink composition is printed on a substrate in order to form a fused colorant loss pigment layer film which further improves transfer of the electrostatic ink composition of claim 1 from the blanket to the substrate during printing. Other ways of ensuring proper transfer and adhesion of the electrostatic ink composition of claim 1 the printed medium include applying methods in the art such as addition of soluble binder, printing on fused film and mixing with colorant-less ink.

The printed medium may be any suitable medium. The printed medium may be any suitable medium capable of having an image printed thereon. The printed medium may include a material selected from an organic or inorganic material. The material may include a natural polymeric material, e.g. cellulose. The material may include a synthetic polymeric material, e.g. a material selected from polyethylene terephthalate, a polymer formed from alkylene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. In an example, the print medium includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The print medium is, in some examples, a cellulosic print medium such as paper. The cellulosic print medium is, in some examples, a coated cellulosic print. In some examples, a primer may be coated onto the print medium, before the electrostatic ink composition is printed onto the print substrate.

Also provided is a method of electrophotographic printing an electrostatic ink composition as described herein, for example as produced in accordance with the second aspect or in accordance with the first aspect, wherein the ink composition comprises particles comprising the resin, the pigment, in some examples dispersed in a liquid carrier, the method comprising:
 forming a latent electrostatic image on a surface;
 contacting the surface with the electrostatic ink composition, such that at least some of the particles adhere to the surface to form a developed toner image on the surface, and transferring the toner image to a print medium.

The surface on which the latent electrostatic image is formed may be on a rotating member, e.g. in the form of a cylinder. The surface on which the latent electrostatic image is formed may form part of a photo imaging plate (PIP). The contacting may involve passing the electrostatic composition between a stationary electrode and a rotating member, which may be a member having the surface having a latent electrostatic image thereon or a member in contact with the surface having a latent electrostatic image thereon. A voltage is applied between the stationary electrode and the rotating member, such that the particles adhere to the surface of the rotating member. This may involve subjecting the electrostatic ink composition to an electric field having a field gradient of 50-400V/μm, or more, in some examples 600-900V/μm, or more.

The intermediate transfer member may be a rotating flexible member, which is in some examples heated, e.g. to a temperature of from 80 to 160° C., in some examples from 90 to 130° C., in some examples from 100 to 110° C.

The method of electrophotographic printing may be carried out so that a plurality of impressions or copies are carried out. The number of impressions or copies may be at least 10, in some examples at least 100, in some examples at least 1000, in some examples at least 2000, in some examples at least 3000, in some examples at least 5000. The print coverage on each print substrate in each impression may be 40% or less, in some examples 30% or less, in some examples 20% or less. An impression may be a single image of one colour formed on a print substrate. A copy may be a single image having a plurality of colours, e.g. selected from black, magenta, cyan and yellow.

The method of electrophotographic printing may be carried out so that a plurality of print substrate sheets are printed, for example 250 or more print substrate sheets, in some examples 500 or more print substrate sheets, in some examples 750 or more print substrate sheets, in some examples 1000 or more print substrate sheets. The sheets may be any suitable size or shape, e.g. of standard printing size, such as A4 or A3.

EXAMPLES

The following illustrates examples of the methods and other aspects described herein. Thus, these Examples should not be considered as limitations of the present disclosure, but are merely in place to teach how to make examples of the present disclosure.

In the following examples, 'Isopar' is Isopar™ L Fluid, produced by ExxonMobil and having CAS Number 64742-48-9.

In the following examples, the resin used is Nucrel 699, available from DuPont, and A-C 5120, available from Honeywell, in a weight ratio of 4:1.

In the following examples, NCD indicates a natural charge director made of three components: KT (natural soya lecithin in phospholipids and fatty acids), BBP (basic barium petronate i.e. a barium sulfonate salt of a 21-26 hydrocarbon alkyl, supplied by Chemtura), and GT (dodecyl benzene sulfonic acid isopropyl amine, supplied by Croda). The composition being 6.6 wt % KT, 9.8 wt % BBP and 3.6 wt % GT, balance 80% Isopar.

In the following examples, SCD indicates a synthetic charge director, being a barium bis sulfosuccinate salt as described in US 2009/0311614 or WO2007130069. This is a strong negative charge director with strong base in the micelle core (barium phosphate) which enhances stable negative charge on ink particle. SCD is a charge director and in the absence of a dispersant) has been found to display very low low field charging (high charge partitioning).

In the following examples, Low field conductivity (LFC) is the electrical conductivity of ElectroInk measured at the following conditions:
Electrical field amplitude: 5-15 V/mm
Frequency: 5-15 Hz
Temperature: 23+/−2 C
Units: pmhO/cm Indigo unit (Called "Picomo"). 1 pmhO/cm Indigo unit approximately equals to 0.85 pS/cm.
Method: A constant amplitude ac voltage is applied to two parallel electrodes and the current via the fluid is monitored. Since the conductivity per definition is proportional to the current and inversely proportional to the voltage inducing the current, the conductivity can be calculated by multiplying the current by a factor depending only on the constant values of the voltage amplitude and geometric parameters, i.e. electrodes surface and distance between the electrodes.

In the following examples, high field conductivity is the maximum electrical conductivity of ElectroInk measured at the following conditions:
Electrical field pulse:
  Shape: Rectangular
  Height: 1500 V/mm
  Duration: 8 sec
  Rise time: 1 ms or less
  Ripple: 10 V/mm or less
Sampling frequency: 1000 per second
Temperature: 23+/−2 C
Units: pmhO/cm (i.e. 1 pS/cm).

In the following examples, dc (direct current) conductivity is the average conductivity measured between 6.4 and 7.2 seconds.
Units: pmhO/cm (i.e. 1 Pico-Siemens/cm)
Method: A constant high voltage is applied to two parallel electrodes and the current via the fluid is monitored. Since the conductivity per definition is proportional to the current and inversely proportional to the voltage inducing the current, the conductivity can be calculated by multiplying the current by a factor depending only on the constant values of the voltage amplitude and geometric parameters, i.e. electrodes surface and distance between the electrodes.
Experience shows that the conductivity of ElectroInk as measured in constant electrical field is varying (actually declining) with time. The maximum value of the conductivity is defined as the "High field conductivity".
dc conductivity is the conductivity at the tail of the conductivity vs. time curve when the conductivity has already leveled off.

In the following examples, particle conductivity (PC) is the difference between the High field conductivity and the low field conductivity.
Units: pmhO/cm (i.e. 1 pS/cm).
Method: The High field conductivity and the Low field conductivity are measured separately and the particle conductivity is calculated as the difference between the two conductivities.
The particle conductivity is proportional to ElectroInk particle properties as mobility and electrical charge created on the particles.

In the following examples, optical density (OD) means the optical density of printed image determined using a 518 spectrodensitometer available from X-rite in Grand Rapids, Mich., USA.

In the following examples, opacity was measured using an Opacimeter BNL-2 Opacimeter, Diano Corp.). Opacity is the characteristic of a single sheet to hide printed material on the reverse side of the sheet.

In the following examples, scanning electro micrographs were produced using a Philips XL40 FEG, Spot size: 3, Acceleration Volt: 20 kV, with the following test procedure: Au coating was done by "sputter"—plasma of Ar ions sputtering Au target causing the Au atoms to deposit on the samples. SEM images were taken in different magnifications.

In the following examples, the pigments used are described in Table 1.

TABLE 1

| Pigment # | Pigment commercial name | Pigment Supplier | Pigment surface treatment | | | | | |
|---|---|---|---|---|---|---|---|---|
| | | | Inorganic surface treatment | | | | Organic | |
| | | | $TiO_2$, wt %, min. | Alumina wt %, max. | Silica, wt %, max | Zirconia | treatment wt %, carbon | Surface hydrophilicity |
| Pigment A | DuPont ™ Ti-Pure ® R-104 titanium dioxide | DuPont | 97 | 1.7 | N/A | N/A | yes, 0.3 wt %, carbon | hydrophobic |
| Pigment B | SACHTLEBEN RFK3 | SACHTLEBEN Chemie GmbH | 93 | Yes | Yes | Yes | Yes, modified polysiloxane | hydrophobic |
| PIGMENT C | SACHTLEBEN R405 | SACHTLEBEN Chemie GmbH | 96 | 1.27 | 0.3 | N/A | Yes, 0.1 wt %, carbon | hydrophobic |

In the following examples, the Ross tool for paste and pasted ink preparation was supplied by Charles Ross & Son Company from Hauppauge N.Y., model number DPM-2. The Laboratory grinding tool for ink preparation was the Union Process® batch-type Szegvari Attritor® system, having a mill size of 1 gallon (1-S).

Example 1

A

TABLE 2

| Formulation Composition Formulation composition | | |
|---|---|---|
| | Weight [gram] | % w/w |
| Paste molten resin 32% NVS F:ACE | 47.8 | 5 |
| White Pigment B: RFK3 | 290.7 | 95 |
| Isopar-L | 1361.5 | |
| % NVS atr. | | |
| Total Weight atr. | 1700 | | formulation having the composition according to Table 2 was produced by a two-stage process.

In the first stage, a paste of molten resin in Isopar-L as a 31% NVS was prepared in a double-planetary mixer device, in which the ingredients (resin and the Isopar-L) were heated to a temperature of from 120° C. to 160° C. and mixed for about 1.5 hours. After this time, the heating was stopped and mixing continued until the ingredients reached room temperature.

In stage 2, the resulting paste or slurry from stage 1 was added to the one gallon ceramic-lined tank of the grinding mill, together with titanium dioxide Pigment B in a 95:5 weight ratio (based on solids), the pigment being the smaller part. Isopar-L was added to give 18% wt NVS in the mill.

NCD in an amount of 80 mg NCD/1 gr solid was added. After grinding at 250 rpm for 3 hours at 45° C., then 9 hours at 40° C., the resulting white ink was diluted with Isopar-L to a working solution of 4.5% NVS and printed on a plastic substrate (a polyester clear corona 12 micron, manufactured by Polyplex) using a WS6000 digital press available from HP-Indigo in Rehovot, Israel.

FIG. 1 shows scanning electron micrographs of the ink of Example 1. From the SEM image it is apparent that the titanium oxide pigment particles are not encapsulated.

In order to further improve transfer from blanket to substrate, this formulation was printed on "fused colorant loss pigment" layer film, produced by printing commercially-available Transparent HP Electroink on HP Indigo presses to produce a transparent film. This showed the ability of digital printing of charged pigments with no need for the pigment to be fully encapsulated by the resin.

Offline development of ink layer on the blanket by using Q/M device and then transferring the developed film from the blanket to the substrate (PET 40 μm) gave film with a high opacity (>90%).

Comparative Example 2

An electrostatic ink composition the same in as in Example 1 was prepared, except that in stage 2, the PIGMENT C pigment with a pigment to resin ratio of 50:50 was used. FIG. 2 shows an electron micrograph in which it is apparent that, at 50% pigment loading, the pigment is encapsulated by the resin.

FIGS. 3 and 4 show scanning electron micrographs of a pigment (denoted PIGMENT C) as received from the supplier. Each shows, at different resolution, particles of $TiO_2$, surface-treated with alumina, silica and a hydrophobic organic treatment.

FIG. 5 shows the particle charge (PC) of examples of electrostatic ink compositions as described herein having different pigments, namely Pigments A and B mentioned above. The particle charge for ink compositions containing Pigments A and B is plotted against the concentration of Charge Director (NCD) (given in mg of charge director per g of solids).

Figure 6:
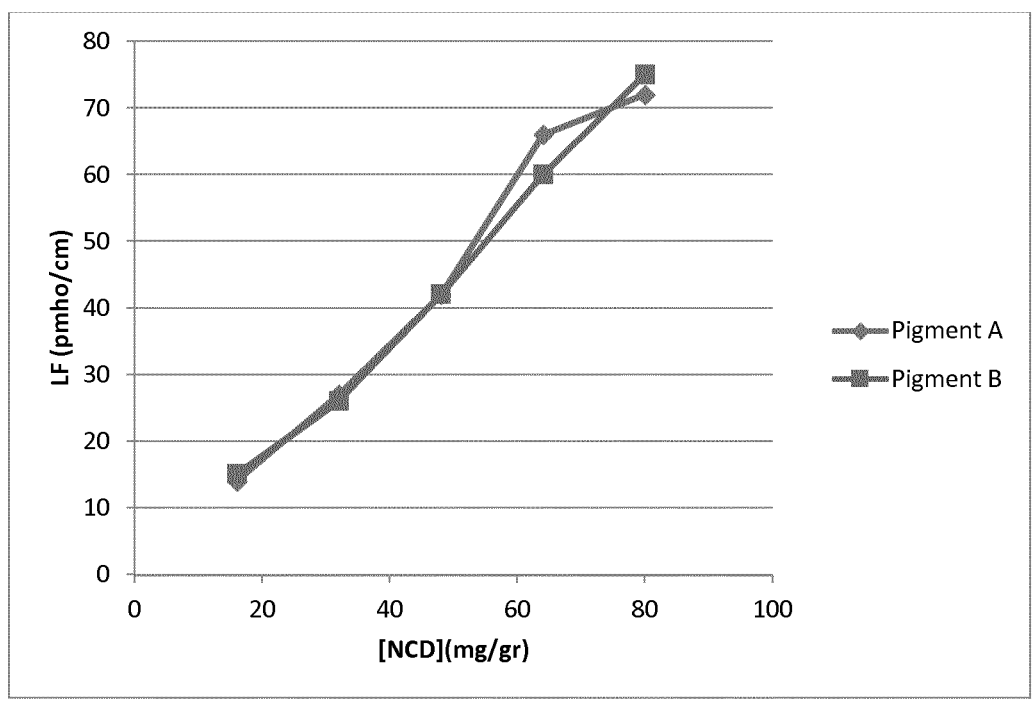
FIG. 6 shows the low field (LF) of examples of electrostatic ink compositions as described herein, again containing Pigments A and B, plotted against the concentration of Charge Director (NCD) (given in mg of charge director per g of solids).

FIG. 6 shows the low field (LF) of examples of electrostatic ink compositions containing different pigments, namely Pigments A and B, plotted against the concentration of Charge Director (NCD) (given in mg of charge director per g of solids).

The above figures show that the white Pigments A and B have the ability to carry necessary charging for LEP process without addition of binding resin and charge adjuvant. The inorganic and organic surface modification on pigment surface is believed to lead to high affinity for the pigment with the charge director. The chargeability of those pigments in non-polar solvents is enhanced by surface treatments which will act as anchoring points for charge director.

In tests, the dispersability of Pigment B at 0.5% NVS, with addition of 1% dispersant (SOLSPERSE® 3000, manufactured by Lubrizol Corp.) and LF~70 in non-polar media, after 24 hr versus comparative example PIGMENT C is much greater—less agglomeration occurred with Pigment B.

In tests, the dispersability of Pigment A at 0.5% NVS, with addition of 1% dispersant and LF~70 in non-polar media, after 24 hr versus comparative example PIGMENT C is much greater—less agglomeration occurred with Pigment A.

The addition of the dispersant to the pigment dispersion at LF70 creates a "protective layer" preventing re-agglomeration and settling out of the pigment particles, resulting in pigment stabilization, while the white pigment in Isopar (without addition of dispersant and at LF~0) settles out.

The above described pigments respond to charge director addition. Applying an electrical field by using Q/M device results in pigment development on the positive side. In this particular, test, it was found that PIGMENT C did not respond to NCD addition resulting in pigment splitting on both sides when an electrical field is applied. The dispersant has no impact on the electrical properties of the pigment.

While the electrostatic ink composition, the method, and related aspects have been described with reference to certain examples, those skilled in the art will appreciate that various modifications, changes, omissions, and substitutions can be made without departing from the spirit of the disclosure. It is intended, therefore, that the method, compositions and related aspects be limited by the scope of the following claims. The features of any dependent claim can be combined with the features of any of the other dependent claims, and any independent claim.

The invention claimed is:

1. An electrostatic ink composition comprising:
   a) chargeable particles comprising white pigment particles having a basic species on their surface; and
   b) a charge director;
   wherein the white pigment particles are present in an amount of at least 75 wt % based on the total weight of the non-volatile solids in the electrostatic ink composition.

2. The electrostatic ink composition according to claim 1, further comprising a liquid carrier.

3. The electrostatic ink composition according to claim 1, further comprising a thermoplastic resin.

4. The electrostatic ink composition according to claim 1, further comprising a dispersant.

5. The electrostatic ink composition according to claim 1, wherein the basic species on the surface of the white pigment particles is an inorganic species.

6. The electrostatic ink composition according to claim 1, wherein the white pigment particles comprise a first metal oxide and wherein the species on the surface comprises a second metal oxide.

7. The electrostatic ink composition of claim 1, wherein the white pigment particles comprise $TiO_2$ particles and wherein the species on the surface comprises alumina and/or zirconia.

8. The electrostatic ink composition according to claim 5, wherein the white pigment particles are also surface treated with an organic species selected from silicones and siloxanes.

9. The electrostatic ink composition according to claim 1, wherein the white pigment is present in an amount of at least 85 wt % based on the total weight of the non-volatile solids in the electrostatic ink composition.

10. The electrostatic ink composition according to claim 1, wherein the white pigment is present in an amount of at least 90 wt % based on the total weight of the non-volatile solids in the electrostatic ink composition.

11. A method of manufacturing an electrostatic ink composition according to claim 1, comprising combining
    a) chargeable particles comprising white pigment particles having a basic species on their surface; and
    b) a charge director;
    wherein the white pigment particles are present in an amount of at least 75 wt % based on the total weight of the non-volatile solids in the electrostatic ink composition.

12. The method of claim 11 comprising:
    grinding the white pigment particles in a carrier liquid, and wherein a charge director is combined with the white pigment particles before, during or after the grinding to form the electrostatic ink composition.

13. The method of claim 11 comprising:
    mixing a resin and a carrier liquid to form a resin paste; and then
    grinding the resin paste with the white pigment particles, and wherein a charge director is combined with the pigment and resin paste before, during or after the grinding of the pigment paste with the pigment to form the electrostatic ink composition.

14. A printed medium having printed thereon an electrostatic ink composition comprising:
    a) chargeable particles comprising white pigment particles having a basic species on their surface; and
    b) a charge director;
    wherein the white pigment particles are present in an amount of at least 75 wt % based on the total weight of the non-volatile solids in the electrostatic ink composition.

15. The printed medium according to claim 14 wherein the printed medium comprises a transparent electrostatic ink composition comprising a thermoplastic resin and a charge director and/or charge adjuvant.

* * * * *